Patented Oct. 19, 1926.

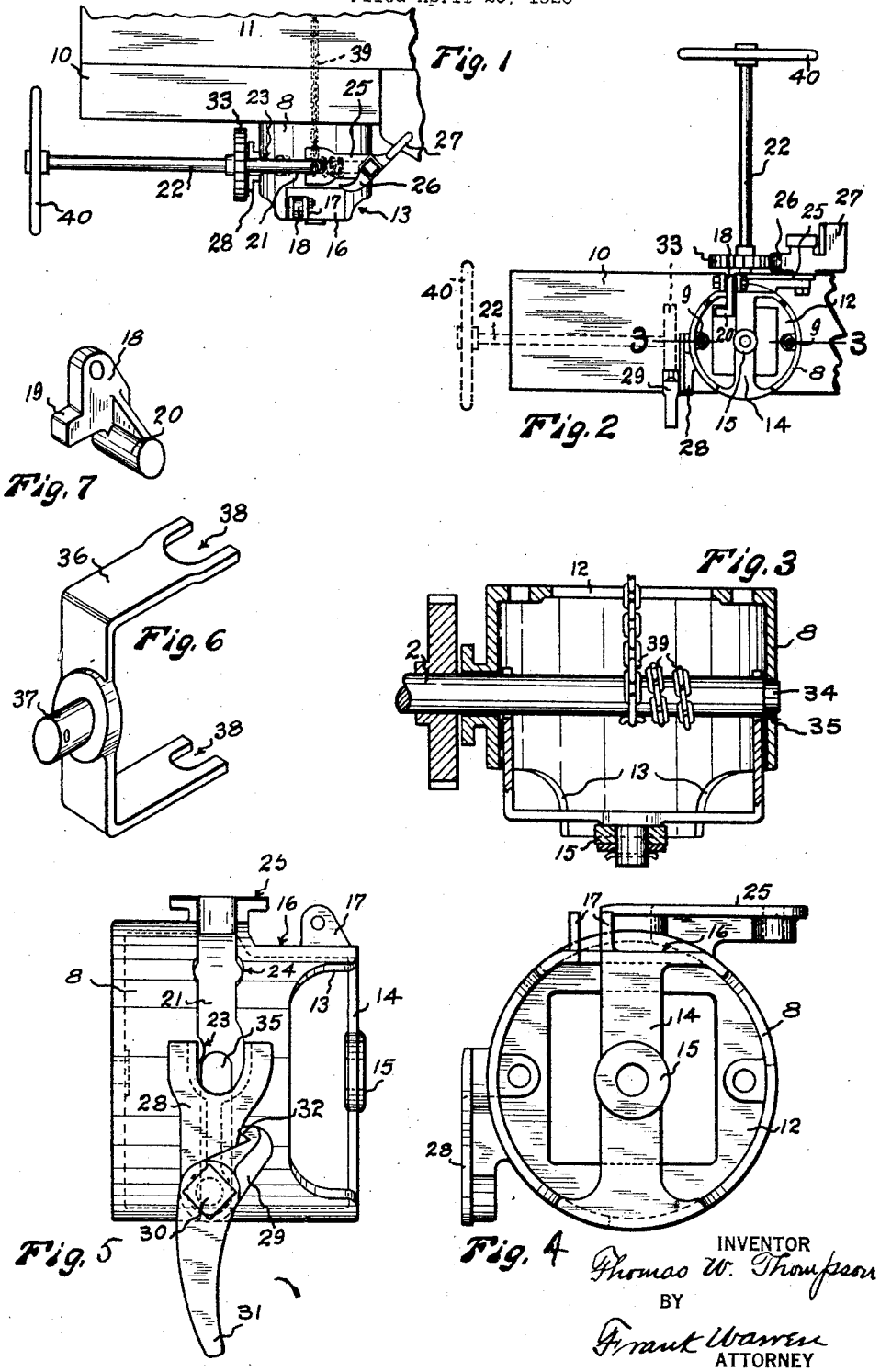

1,604,088

UNITED STATES PATENT OFFICE.

THOMAS W. THOMPSON, OF RENTON, WASHINGTON, ASSIGNOR TO PACIFIC CAR AND FOUNDRY COMPANY, OF SEATTLE, WASHINGTON.

BRAKE MECHANISM.

Application filed April 29, 1926. Serial No. 105,381.

My invention relates to improvements in hand operated brakes for use on railroad cars and the object of my invention is to provide a brake in which the brake staff is pivotally mounted for swinging movement between a vertical and a horizontal position so that the brake may be operated either from the top or from the side of the car. The structure that supports the brake staff for swinging movement being arranged so that the line of pull of the chain or tension member by which the brake force is exerted will remain substantially unchanged for all positions of the brake staff.

Another object is to provide a brake in which a brake staff, whereon a brake chain is wound, is supported in a frame and guided by a pivotally mounted yoke in such a manner that the line of pull of the brake chain will be substantially in line with the pivot of the yoke.

Other and more specific objects will be apparent from the following description taken in connection with the accompanying drawings, wherein—

Figure 1 is a fragmentary plan view of the end of a flat car showing my brake applied thereto, the brake staff being in the horizontal position.

Fig. 2 is a fragmentary end view of the flat car end sill showing by full lines the brake staff in the vertical position and by broken lines the brake staff in the horizontal position.

Fig. 3 is a fragmentary sectional view on a larger scale substantially on broken line 3, 3 of Fig. 2, the brake staff being shown in the horizontal position.

Fig. 4 is a detached view in end elevation of the brake staff bracket.

Fig. 5 is a detached view in side elevation of the brake staff bracket showing certain pawls attached thereto.

Figs. 6 and 7 are detached views of the brake staff swivel yoke and the pawl for holding the yoke in an upright position respectively.

Referring to the drawings, throughout which like reference numerals indicate like parts, 8 is a brake staff bracket that is rigidly secured by bolts 9 to the end sill 10 of a flat car 11 of the form commonly used for logging purposes, the bolts 9 passing through inturned flanges 12 on the inner end of the brake staff bracket 8.

The brake staff bracket 8 is preferably of cylindrical shape with its sides cut away at the outer end, as at 13, and an integral web 14 extending diametrically across said outer end in a vertical position, said web 14 having a centrally arranged bearing hub 15. The top of the bracket 8 is flattened, as at 16, at the outer end, and two spaced lugs 17 extend upwardly from said flattened portion at one side of the medial vertical plane to afford a pivotal support for a dog or pawl 18 which has a locking projection 19 and is provided with a weight portion 20 at the bottom whereby the pawl 18 will be urged by gravity into a vertical position.

The brake staff bracket 8 is provided between the two ends with an upper peripheral slot 21 that has one end located on the top of said bracket and that extends slightly more than one-fourth of the distance around said bracket to permit a brake staff 22 that projects through and is guided in said slot 21 to be moved between a vertical and a horizontal position. The walls of the slot 21 are curved near the lower end to provide a hump 23 over which the brake staff 22 must pass each time it is moved into or away from the lowered position. This hump 23 tends to prevent upward movement of the brake staff 22 if the brakes are tightened while the staff is in the horizontal position. A slight enlargement 24 is provided in the slot 21 between its two ends to facilitate the insertion of the brake staff 22 and the assembly of the various parts.

The slot 21 terminates at the upper end in a horizontal shelf 25 which forms a bearing for the brake staff 21 when it is vertical and constitutes a support upon which a pawl or dog 26 may be secured by a suitable pivot bolt. The rear end of the dog 26 is flattened, as at 27, to afford a relatively large foot piece by which said dog may be operated. A vertical shelf or bracket 28 on the side of the brake staff bracket 8 cooperates in forming a bearing at the lower end of the slot 21 and affords means upon which a dog 29 is fulcrumed by a bolt 30. A relatively heavy end 31 is provided on the dog 29 to hang downwardly by gravity and hold the hooked end 32 of said dog in engagement with a ratchet wheel 33 that is secured on the brake staff 22.

The inner end 34 of the brake staff 22 is of smaller diameter, as shown in Fig. 3, and is operatively disposed in a circumferential slot 35 located in that quadrant of the brake staff bracket 8 which is substantially opposite the slot 21. A yoke 36 shown in Fig. 6 has a pivot stud 37 that is journaled in the hub 15 of the cross bar 14 and the two ends of said yoke 36 are notched as at 38 to fit over the brake staff 22 and guide said brake staff for swinging or pivotal movement. It will be noted that any pull or strain on the brake staff 22 is borne by the bracket 8 and that the yoke 36 merely acts as a guide and pivot member. Suitable means are provided for preventing removal of the brake staff from the bracket 8.

A brake chain 39 is wound on the brake staff 22 within the bracket 8 and between the two ends of the yoke 36 and extends outwardly through a suitable hole or holes in the rear end of the bracket 8 and in the adjacent frame 10 of the car and may be connected with any conventional brake mechanism, not shown, so that the brakes may be set by rotataing the brake staff and exerting a pull on the chain. A hand wheel 40 is provided on the outer end of the brake staff 22.

In operation the brake staff may be rotated either when it is in the vertical or the horizontal position to wind the chain 39 thereon and apply the brakes and the adjacent dog may be caused to engage with the ratchet wheel 33 to hold the brake staff 22 until such time as said dog is withdrawn to release the brakes. The brake staff will be held in the vertical position by engagement of the end 19 of the dog 18 with the yoke 36 and said dog must be manually released before the brake staff can be lowered. The hump 23 in the slot 21 prevents the brake staff from jarring or working upwardly from the horizontal position. The chain 39 preferably takes off of the staff 22 substantially in line with the pivot 37 about which said brake staff swings in moving from one position to another so that the change in the direction of the line of pull of said chain takes place when the brake staff is moved from vertical to horizontal or horizontal to vertical position will be reduced to a minimum. The strain due to the setting of the brakes will all be borne directly by the bracket 8 and transmitted directly from the bracket to the car body, the yoke 36 only acting as a pivot member. It will be noted that the winding of the chain on the brake staff all occurs between the limits formed by the two ends of the yoke 36.

The foregoing description and accompanying drawings clearly disclose a preferred embodiment of my invention but it will be understood that this disclosure is merely illustrative and that numerous changes may be made within the scope and spirit of the following claims.

What I claim is:

1. In a brake mechanism, a cylindrical brake staff bracket, a brake staff extending diametrically through said bracket, means supporting said brake staff for swinging movement about the axis of said bracket between a vertical and a horizontal position and brake operating means connected with said brake staff within said bracket.

2. In a brake mechanism, a cylindrical brake staff bracket, a brake staff extending diametrically into said bracket, a yoke pivoted on the axis of said bracket and supporting said brake staff for swinging movement between a vertical and a horizontal position and a flexible brake operating member extending into said bracket and wound upon said brake staff.

3. In a brake mechanism, a cylindrical brake staff bracket having a circumferential slot, a brake staff projecting through said slot into said bracket and arranged to be moved between a vertical and a horizontal position, means guiding said brake staff for swinging movement, and a brake chain wound upon said brake staff within said bracket and extending outwardly from said bracket.

4. In a brake mechanism, a brake staff bracket having slots therein, a brake staff movable in said slots in said bracket into different operative positions and brake operating means connected with said brake staff the stress produced by said brake operating means being borne by the walls of said slots.

5. In a brake mechanism, a brake staff bracket having slots therein, a brake staff movable in said slots between a vertical and a horizontal position, a brake operating tension member connected with said brake staff, the stress due to tightening of said tension member being borne by the walls of said slots and a yoke guiding said brake staff for swinging movement in said bracket.

6. A brake mechanism of the class described embodying a cylindrical brake staff bracket having two oppositely disposed peripheral slots each extending substantially one fourth of the distance around said bracket, a brake staff arranged diametrically of said bracket and movable in said slots between a vertical and a horizontal position, a yoke in said bracket pivoted axially of said bracket and having forked ends that fit over said brake staff to guide said brake staff for swinging movement, a brake chain extending into said bracket and wound upon said brake staff between the ends of said yoke, said brake staff being arranged to bear against the walls of said slots when tension is exerted on said chain, and means for locking said brake staff against rotation in one direction when said brake staff is in a vertical or in a horizontal position.

7. In a brake mechanism of the class described, a brake staff bracket having slots therein, a brake staff projecting into said slots and guided in said bracket for swinging movement between a horizontal and a vertical position, a brake chain wound on said brake staff, means on said bracket for locking said brake staff against rotation in one direction when said brake staff is vertical, and other means on said bracket for locking said brake staff against rotation when said brake staff is horizontal.

In witness whereof, I hereunto subscribe my name this 17th day of April A. D. 1926.

THOMAS W. THOMPSON.